United States Patent Office 3,436,087
Patented Apr. 1, 1969

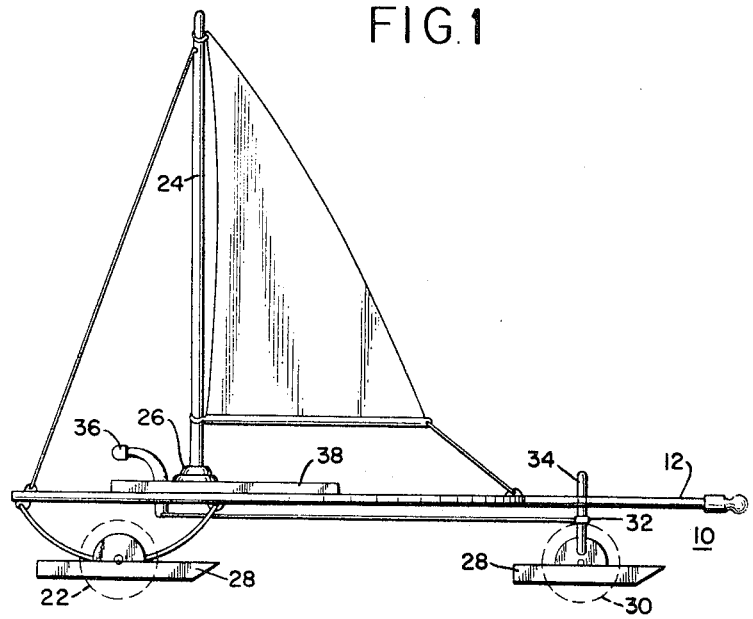
FIG.1
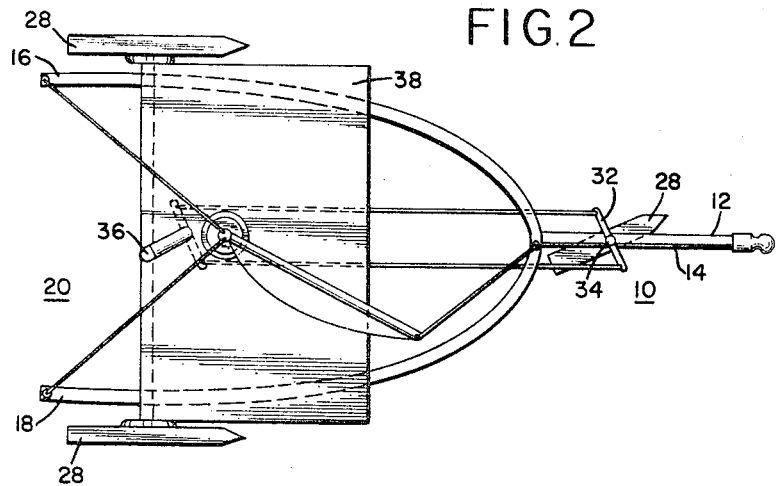
FIG.2
FIG.3
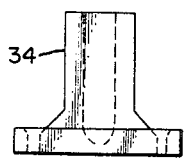
INVENTOR.
JESSE D. NOLAND

3,436,087
TRAILER CONVERSION KIT
Jesse D. Noland, 2411 McElderry St.,
Baltimore, Md. 21205
Filed Oct. 24, 1965, Ser. No. 504,361
Int. Cl. B62b 13/18, 19/04, 15/00
U.S. Cl. 280—8
3 Claims

ABSTRACT OF THE DISCLOSURE

This device is a collection or kit of specialized parts comprising sail, plurality of runners, cables, steering devices, and associated clamps that allows the modification of an existing boat carrying trailer, so that it can operate as an iceboat.

---

This invention relates to boat trailers and more specifically to a novel kit to permit the conversion of a typical boat trailer for use as an iceboat.

It is an important object of the invention to provide a mobile unit presenting a trailer for transporting a small boat such as those popularly known as an outboard type overground, and yet, by using the kit, may be quickly and easily converted to a condition whereby the unit may be used and converted on ice in the form of what is commonly known as an iceboat.

It is, further, an important object of the present invention to provide a kit to convert a mobile unit as described, wherein the trailer may be converted, that is, a boat trailer can be converted to an iceboat by use of expedient substituting skates for the respective wheel structures of the trailer and providing a steering skate means for the trailer frame assembly.

Also, an important object of this invention is to provide a mobile unit kit adapted for utilization as an iceboat, having novel means thereon permitting steering of a skate connected to the trailer frame assembly, from the position within and at the rear most end of the boat mounted on the frame assembly at a predetermined position.

Still further, an object of the invention is to provide a kit to convert a boat trailer to a mobile unit wherein the components which engage the ground, and which may be either wheels or skates, depending upon the use to which the unit is placed, are constructed to compensate for irregularities in the surface over which the unit is moving, thereby to prevent deleterious strains being imparted to the frame assembly of the converted trailer.

Still further, an object of the invention is to make a low cost, practical, compact, easily assembled kit, which can be used to adapt a majority of boat trailers to use as an iceboat of the sailing variety. Other important objects and details of construction of the present kit, convertible unit, will become known and will be explained in greater detail as the following specifications progress;
In the drawings:
FIGURE 1 is a plan view of the present mobile unit illustrating the same when adapted for utilization on ice.
FIGURE 2 is a side elevation view of the mobile unit as adapted for utilization on ice.
FIGURE 3 is an enlarged fragmentary perspective view of the steering skate and its control.

In FIGURES 1 thru 3, inclusive, the basic frame assembly 12 of the unit 10, which is generally unchanged, whether the latter is used for a boat trailer or an iceboat, preferably comprises an elongated main member support generally parallel to a normal path of travel of the unit 10. This long unit 14 branches into a wishbone shape 16 and 18. The axle 20 has attached to either end wheels 22. A main mast 24 is fitted to a socket 26.

Wheels 22 are replaceable by runners 28 which have an angular brace at the top and an opening at substantially the center of the upper half of the runner and a pair of holes thru said runner in spaced relationship adapted to be bolted to the bolt circle of the hub when the wheels are removed. The front steering wheel 30 is replaced by the steering bar 32. The steering bar 32 fits in a specially adapted shaft socket 34. When steering wheel 30 is removed the steering bar and runner is attached to steering tiller 36 on mounting board 38 which rests on the frame of the wishbone 18 and 16.

Once the mounting board 38 has been bolted in place with socket for main sail 24, and main sail 24 put in place and the wheels are replaced by runners and the steering tiller attached in end socket and connected to the steering runner unit, it is ready to be used as an ice boat without further modifications.

It is important to note that many different means of attaching runners to wheels and axles have been proposed, such as those which are shown in Patent No. 2,817,536, therein the clamping means is a shoe that clamps over the wheel; in 1,346,052 wherein the wheel is removed and there is a special clamp adapted to fit on the stub axle. A similar one is shown in Patent No. 1,424,011 and a ball and socket type arrangement is shown in Patents Nos. 2,997,301 and 1,418,829 and 1,409,501; but apparently no where is shown the simple expedient of bolting the sled runner to the bolt circle of the wheel drum after the wheel has been removed. In Patent No. 2,950,924 there is something that at first appears similar to this, however, it can be seen by FIGURE 2 that the runner is bolted to the frame assembly and not to the axle or to the wheel housing.

In this invention, the kit is shown as having sail, the runners and the steering mechanism, all complete and by their mere addition to a boat trailer, a useful, practical iceboat can be adapted or can be constructed. It is felt important to note that the device does not use a flat plate for mounting the steerable front runner or side runners as shown in Patent No. 3,051,503 by Halperin.

Further, by not leaving the boat in place at the time the boat trailer is used as an iceboat, the center of gravity can be kept considerably lower, thus eliminating the necessity for having extensions to the side to get the same amount of stability.

Further, this kit for iceboat modification is complete with sail for being wind driven as is usual among iceboats.

A further advantage of the subject invention is that there are no additional springs needed, the springing that exists from the normal wheels is used in the case of the conversion to the iceboat. This is considerable savings in money.

Having thus described the invention, what is claimed as new and desired to be secured by Letters Patent is:
1. An iceboat comprising in combination:
 a boat trailer frame, said frame having a steerable front support member and a pair of rear support members, each of said support members having wheel lugs mounted to the lower end thereof, said lugs being adapted to have wheels mounted thereon;
 iceboat runner means removably attached to said wheel lugs;

mounting means removably mounted on said frame, a mast and sail mounted on said mounting means; and tiller mechanism means operably connected to said steerable front support.

2. The device of claim 1 wherein said mounting means is a flat rigid member resting on the upper side of said frame.

3. The device of claim 1 wherein said iceboat runner means includes a flange means, said flange means having at least two wheel lug openings adapted to receive at least two of said wheel lugs.

References Cited

UNITED STATES PATENTS

| 3,026,121 | 3/1962 | Ellam | 280—16 |
| 3,051,503 | 8/1962 | Halperin | 280—16 |

LEO FRIAGLIA, *Primary Examiner.*

L. D. MORRIS, JR., *Assistant Examiner.*

U.S. Cl. X.R.

280—16